United States Patent [19]

Kuntz et al.

[11] 4,149,568
[45] Apr. 17, 1979

[54] DOUBLE WALLED FUEL LINE

[75] Inventors: Donald A. Kuntz, Morton; Michael A. Winters, Peoria, both of Ill.

[73] Assignee: Caterpillar Tractor Co., Peoria, Ill.

[21] Appl. No.: 858,226

[22] Filed: Dec. 7, 1977

[51] Int. Cl.² .................................. F16L 9/18
[52] U.S. Cl. ................................. 138/114
[58] Field of Search ................. 138/114, 148, 104

[56] References Cited

U.S. PATENT DOCUMENTS

| | | | |
|---|---|---|---|
| 1,389,768 | 9/1921 | McFarland | 138/148 |
| 1,481,255 | 1/1924 | Cumfer | 138/114 X |
| 1,737,161 | 11/1929 | Jupp | 138/114 |
| 2,468,902 | 5/1949 | Villiger | 138/114 |
| 2,475,635 | 7/1949 | Parsons | 138/114 |
| 2,512,116 | 6/1950 | Siebels | 138/114 |
| 2,838,074 | 6/1958 | Lauck | 138/114 X |
| 3,299,417 | 1/1967 | Sibthorpe | 138/114 |
| 4,014,369 | 3/1977 | Kobres | 138/112 |

FOREIGN PATENT DOCUMENTS 543968 6/1922 France ..................... 138/148

Primary Examiner—Harry N. Haroian
Attorney, Agent, or Firm—Wegner, Stellman, McCord, Wiles & Wood

[57] ABSTRACT

A double walled fuel line for use with fuel injection engines including first and second, nominally concentric tubes having an annular space therebetween. both of the tubes are bendable on conventional tube bending equipment and the innermost tube mounts fittings for connection into a fuel injection system. An additional fitting associated with the outermost tube establishes fluid communication to the annular space between the tubes for venting leaking fuel.

6 Claims, 4 Drawing Figures

DOUBLE WALLED FUEL LINE

BACKGROUND OF THE INVENTION

This invention relates to fuel lines for use in fuel injection systems to interconnect a fuel pump and an injection nozzle.

Fuel injection pumps employed in fuel injection systems generate extremely high hydraulic pressures which may range upwardly from several thousand pounds per square inch. The pressures are generated in pulse form to direct fuel from the pump through fuel lines to injection nozzles, typically associated with engines or the like. Because of raid cycling and/or vibration associated with the power plant with which the injection system may be used, there may be a tendency for fittings to loosen and/or conduits to fracture under the pressures involved.

In the case of either, fuel spillage will occur and such spillage is particularly undesirable where the engine is operating in an enclosed area and/or substantially unattended thereby causing combustible vapors to form and/or permitting a sizable accumulation of fuel to occur in an area where it is unlikely to be discovered.

To avoid such difficulties, it has been suggested to provide double walled fuel lines so that if the fuel carrying conduit ruptures, lost fuel will be captured by an outer conduit to prevent leakage. This approach eliminates leakage due to fuel line rupture but does not prevent leakage due to loosening of interengaging parts which are intended to be sealed. Moreover, heretofore, this approach has been practiced using rigid, precisely dimensioned, unbendable pipes or the like, thereby making it extremely difficult to route fuel lines from an injection pump to an injection nozzle.

SUMMARY OF THE INVENTION

The present invention is directed to overcoming one or more of the above problems.

According to the present invention, there is provided a fuel line adapted to be associated with fuel injection engines comprising a first, elongated, metal tube having a wall thickness sufficient to withstand the high pressures associated with fuel injection pumps and yet be bent with conventional tube bending equipment. A second, elongated, metal tube is nominally coaxially disposed about the first tube in spaced relation thereto to define an annular space and is relatively thin-walled so as to be bendable, with the first tube, with conventional tube bending equipment. Fittings are disposed on each end of the first tube for connecting the first tube between an injection pump and a fuel injection nozzle, and there are further provided means including an additional fitting sealing the ends of the second tube to the first tube, the additional fitting including a vent port in fluid communication with the space between the two tubes to direct spilled fuel to a desired collection point.

Other objects and advantages will become apparent from the following specification taken in connection with the accompanying drawings.

DESCRIPTION OF THE PREFERRED EMBODIMENT

Figure 1:
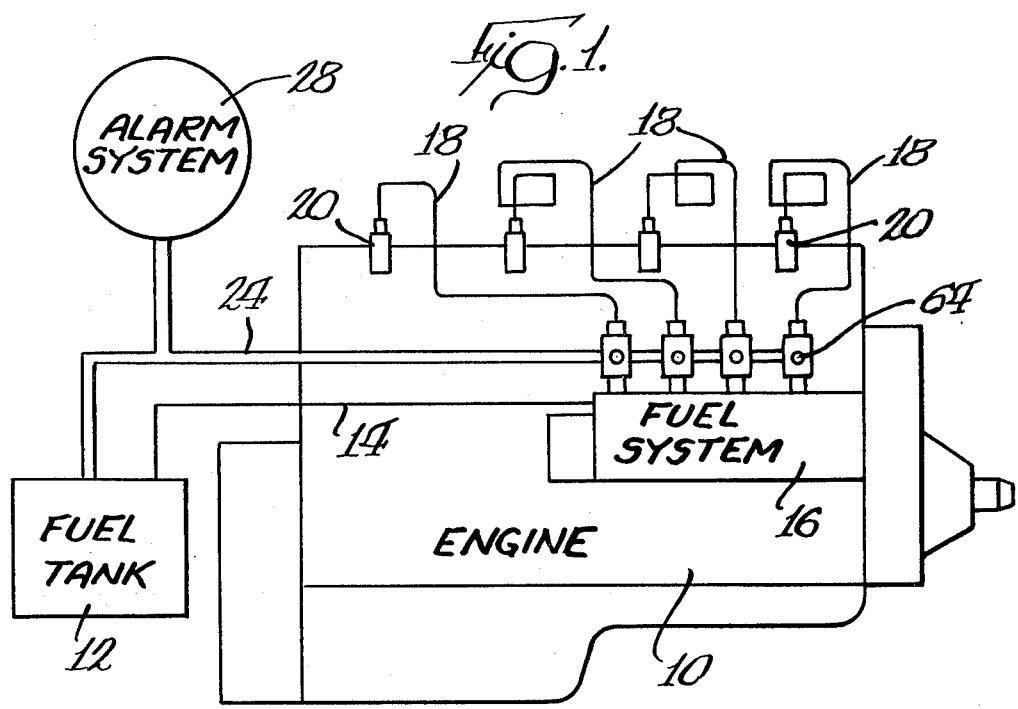
FIG. 1 is a schematic view of an engine and fuel supply provided with a fuel injection system utilizing fuel lines made according to the invention.

Fuel lines made according to the invention are intended to be utilized, for example, with an engine 10 supplied with fuel from a tank 12. The tank 12 has a conduit 14 extending to a conventional fuel injection pump 16 which, in turn, provides fuel under pressure and in pulse form in a desired sequence to a plurality of fuel lines 18, to be described, which convey the fuel to conventional fuel injection nozzles 20 associated with the engine 10. As will be seen, the fuel lines 18 are double walled and are provided with means which direct leaking fuel to a conduit 24 by which it may be returned to the tank 12 or, alternatively, to the input of the injection pump 16, or to an alarm 28.

Figure 2:
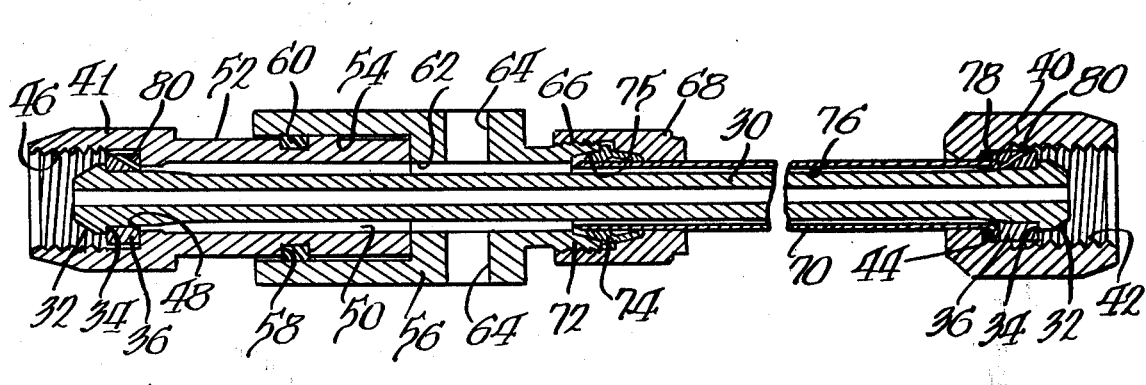
FIG. 2 is a sectional view of a fuel line made according to the invention.

The fuel lines 18 are adapted to so return leaked fuel if the fuel leakage occurs either due to rupture or to leakage at the fittings. With the foregoing in mind, one embodiment of a fuel line made according to the invention will be described in greater detail with reference to FIGS. 2-4, inclusive.

The fuel line includes a first, elongated, metallic rigid tube 30 which has a wall thickness sufficient to withstand the high pressures generated by the pump 16. The precise wall thickness will depend upon the inner diameter of the tube 30 which, in turn, will be dependent upon the pressures generated as well as fuel delivery requirements and are well known in the art, forming no part of the present invention. In the overwhelming majority of cases, such criteria will result in the tube 30, while rigid, being bendable by conventional tube bending equipment.

Each end of the tube 30 is provided with a sealing surface 32 which, as illustrated, is frusto-conical such that the two surfaces 32 are opposed from each other and oppositely axially directed. They also face radially outwardly. The surfaces 32 are formed integrally on the tube 30 after other components to be described are assembled thereon. In the usual case, the surfaces 32 will be formed by cold forming as swaging. Just axially inwardly of each of the surfaces 32 is a shoulder 34, also cold formed, against which a sealing washer 36 is abutted. The washers 36 will typically be formed of steel or iron and will not deteriorate upon exposure to petroleum products.

Figure 3:
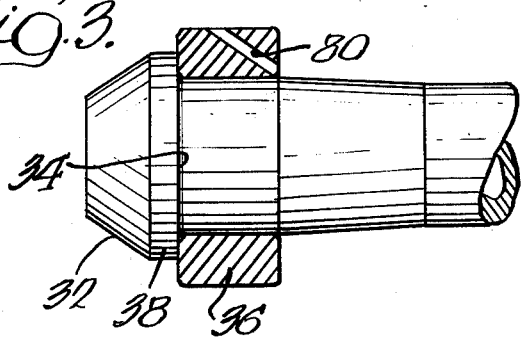
FIG. 3 is an enlarged view of one end of a fuel line made according to the invention.

It will be observed from FIG. 3 that each sealing washer 36 extends radially outwardly from the radially outer extent 38 of each sealing surface 32 for purposes to be seen.

The respective ends of the tube 30 are provided with nuts 40 and 41, each having an external hex head configuration (not shown) for conventional tightening purposes. The nut 40 has an interior threaded surface 42 by which the same may be affixed to a male fitting associated with either the pump 16 or nozzle 20, the male member being provided with a sealing surface that will mate with the sealing surface 32 at the associated end of the tube 30.

Oppositely of the threaded surface 42 is a radially inwardly directed shoulder 44 for purposes to be seen and intermediate the surface 42 and the shoulder 44, the nut 40 receives and houses both the associated washer 36 and the sealing surface 32.

The nut 41 is provided with a similar threaded surface 46 for capturing a threaded male member having a sealing surface designed to seal against the sealing surface 32 at the associated end of the tubing 30 as well as a radially inwardly directed shoulder 48 which abuts the washer 36 at the associated tubing end with the intermediate portion of the nut housing both the washer 36 and the sealing surface 32.

Axially inwardly of the shoulder 48 is an enlarged diameter bore 50. The end of the nut 41 remote from the internally threaded end 46 is of reduced diameter, as shown at 52, and is received within an enlarged diameter bore 54 within a fitting 56. A radially outwardly opening, peripheral groove 58 in the nut 41 receives an annular seal 60 to establish a seal at the interface between the fitting 56 and the nut 41.

The bore 54 extends to a reduced diameter bore 62 within the fitting 56. As illustrated, the tube 30 extends through both bores 62 and 50 and is of lesser diameter than either. Two radially directed ports 64 are provided with threads (not shown) and extend to the small diameter bore 62. One of the bores 64 is adapted to be connected to the conduit 24 or 26, or alarm 28, while the other will typically be provided with a removable plug for purposes to be seen.

The right-hand end of the fitting 56 is provided with a threaded, reduced diameter section 66 which receives the nut 68 of a conventional compression fitting.

A second, elongated, metal, rigid tube 70, bendable with conventional tube bending equipment, has an end 72 extending through the nut 68 and into the reduced diameter bore 62. A conventional, sealing sleeve 74 is disposed on the end 72 and within the nut 68 to partially enter the bore 62 as well. Consequently, upon tightening of the nut 68, the sleeve 74 sealingly engages both the outer diameter of the second tube 70 and the flared end 75 of the bore 62. The outer diameter of the tube 70 is just slightly less than the diameters of the of the bores 60 and 62. Thus, both the nut 41 and the fitting 56 may telescope onto the tube 70 to expose the ends of the tube 30 to allow forming of the surfaces 32 and shoulders 34.

Moreover, the tube 70 is circular in cross section as is the tube 30 and has an inner diameter greater than the outer diameter of the tube 30 and is nominally concentrically disposed about the tube 30. Because of the relationship of inner and outer diameters, an elongated, annular space 76 exists between the tubes 30 and 70. The end of the tube 70 remote from the end 72 is flared slightly as at 78 and is in abutment with the sealing washer 36 associated with the nut 40.

As a consequence of the foregoing, it will be appreciated that when the nuts 40 and 41 are secured to male members in the fuel injection system and the nut 68 is tightened, the ends of the tube 70 will be sealed to the tube 30 so that any rupture of the tube 30 will result in leaking fuel being directed to the annular space 76 to flow therethrough to the bore 62 and then via one of the ports 64 to the return line 24 and activate the alarm 28. The presence of fuel in the annular space 76 of any of the lines may be visually observed by removing the plug (not shown) asssociated with the other of the ports 64 to assist in determining the leaky line.

In order to direct leaking fuel due to looseness of interengaging sealing surfaces 32 to the return line 24, one or both of the washers 36 may be provided with a small passage 80, as seen in FIG. 3. The passage 80 extends generally axially through the washer 36 to establish fluid communication between the annular space 76 and a point radially outwardly of the radially outwardmost extent 38 of the sealing surfaces 34. Thus, any leaking fuel traveling along the surfaces 32 will ultimately reach the passage 80 to be directed to the return line 24.

In order to provide a fuel line that is bendable on conventional tube bending equipment, the tube 70 is provided with a relatively thin wall. In most cases, the wall thickness will be on the order of about 1 mm. or less and, in a highly preferred embodiment, wherein the outer diameter of the tube 70 is slightly less than 0.4 inch, will be about 0.7 mm. The tube 70 may be formed of steel or other similar materials.

Figure 4:
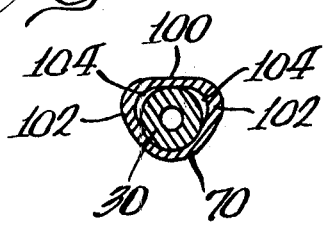
FIG. 4 is a sectional view illustrating a typical relationship of the components of the inventive fuel line when bent.

FIG. 4 illustrates a typical cross section taken through the tubes 30 and 70 intermediate their ends after being bent by tube bending equipment. The surface 100 of the tube 70 engaged by the tool tends to flatten and immediately adjacent thereto, the surface bulges as at 102 on opposite sides of the tube 70. The tube 30 is substantially nondistorted and is engaged at opposite sides by the tube 70. However, areas 104 in the vicinity of the bulges 102 remain open as part of the annular space 76 to allow the flow of fuel to the return line 24 in the manner previously described.

Thus, it will be appreciated that a fuel line made according to the invention ensures against fuel spillage due to either rupture of the main fuel line or leakage at sealed connections. It also provides the significant advantage of being bendable with conventional tube bending equipment without fear of blocking the flow path to the return line, thereby allowing easy installation without requiring precisely fitted pipes or the like.

A highly significant feature of the invention is the absence of interengaging structure extending between the tubes 30 and 70 within the annular space 76. If such structure were present, deformation such as illustrated in FIG. 4 during bending of the fuel line would not occur, but rather, the structure would tend to collapse the first, thereby decreasing its fuel carrying capacity and interfering with proper operation of the injection system.

From the foregoing, it will be appreciated then that the invention provides a highly useful double walled fuel line for use with fuel injection systems.

The embodiments of the invention in which an exclusive property or privilege is claimed are defined as follows:

1. A fuel line adapted to be associated with fuel injection engines comprising:
   a first elongated, metallic, bendable tube generally circular in cross section and having a wall thickness sufficient to normally withstand the high pressures associated with fuel injection pumps;
   a pair of fittings, one rotatably disposed at each end of said first tube, for connecting said tube into a fuel injection system;
   a second, elongated, metal tube, generally circular in cross section, disposed normally concentrically about said first tube and having an inner diameter greater than the outer diameter of said first tube and further having a relatively thin wall so as to be bendable with conventional tube bending equipment;
   means substantially sealing the ends of said second tube to said first tube and for preventing substantial relative axial movement between said tubes;
   said sealing means including a further fitting between the fittings of said pair and including a port in fluid communication with the interior of said second tube.

2. A fuel line adapted to be associated with fuel injection engines comprising:
- a first, elongated, rigid, metal tube having a wall thickness sufficient to withstand the high pressures associated with fuel injection pumps and yet be bent with conventional tube bending equipment;
- a second, elongated, rigid, metal tube nominally coaxially disposed about said first tube in spaced relation thereto to define an annular space and being relatively thin walled, having a wall thickness on the order of about 1 mm. or less so as to be bendable with conventional tube bending equipment;
- said annular space being free from structure extending between said tubes along substantially the length thereof;
- fittings on each end of said first tube for connecting said first tube between a fuel injection pump and a fuel injection nozzle; and
- a pair of means, one including an additional fitting, sealing the ends of said second tube to said first tube, said additional fitting including a vent port in fluid communication with said annular space.

3. A double walled fuel line for use with fuel injection engines comprising:
- a first, elongated, rigid, metal tube having opposed ends and being generally circular in cross section with a wall thickness sufficient to withstand fuel injection pressures and yet be bent on conventional tube bending equipment;
- axially oppositely directed, radially outwardly facing sealing surfaces on said first tube ends;
- a pair of sealing washers, one on each first tube end just axially inwardly of the respective sealing surface;
- a pair of nuts, one on each first tube end and rotatable thereon, said nuts housing respective ones of said washers and said sealing surfaces;
- a fitting connected to one of said nuts;
- a second, elongated, metal tube, generally circular in cross section nominally concentrically disposed about said first tube in spaced relation thereto to define an elongated annular space, said second tube having a relatively thin wall so as to be bendable with said first tube on conventional tube bending equipment, one end of said second tube being captured within the other of said nuts in substantial abutment with the associated washer to be thereby substantially sealed to said first tube, the other end of said second tube being sealed to said fitting;
- a port in said fitting; and
- a bore in said fitting of larger cross section than said first tube and receiving said first tube and said second tube other end, said port extending to said bore to establish fluid communication between said port and said annular space.

4. The fuel line of claim 3 wherein said fitting includes two said ports each extending to said bore, one adapted to be connected to a vent for said annular passage and the other being adapted to be selectively opened or closed to enable inspection to determine whether fuel is in said annular space.

5. The fuel line of claim 3 wherein at least one of said washers has a greater radius than the corresponding sealing surface, and further including an axial passage in said washer extending from said annular space through the washer to a point radially outwardly of the corresponding sealing surface to direct fuel leaking from said first tube along the corresponding sealing surface to said annular space.

6. The fuel line of claim 3 including a sealing sleeve on said second tube other end and engaging an end of said bore, a further nut on said second tube other end and threaded to said fitting about said bore to cause said sleeve to seal against said bore and said second tube other end, the other end of said bore having an enlarged diameter partially receiving said one nut, and an annular seal at the interface of said bore and said one nut.

* * * * *